US010492237B2

(12) United States Patent
Castro Castro et al.

(10) Patent No.: US 10,492,237 B2
(45) Date of Patent: Nov. 26, 2019

(54) MOBILE GATEWAY SELECTION USING A DIRECT CONNECTION BETWEEN A PCRF NODE AND A MOBILITY MANAGEMENT NODE

(71) Applicant: TELEFONAKTIEBOLAGET L M ERICSSON (PUBL), Stockholm (SE)

(72) Inventors: Fabian Castro Castro, Madrid (ES); John Stenfelt, Göteborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 213 days.

(21) Appl. No.: 14/764,816

(22) PCT Filed: Feb. 1, 2013

(86) PCT No.: PCT/EP2013/052072
§ 371 (c)(1),
(2) Date: Jul. 30, 2015

(87) PCT Pub. No.: WO2014/117865
PCT Pub. Date: Aug. 7, 2014

(65) Prior Publication Data
US 2015/0382386 A1 Dec. 31, 2015

(51) Int. Cl.
*H04W 76/11* (2018.01)
*H04W 48/00* (2009.01)
(Continued)

(52) U.S. Cl.
CPC ......... *H04W 76/11* (2018.02); *H04L 12/1407* (2013.01); *H04L 61/2007* (2013.01); *H04W 48/17* (2013.01); *H04W 88/02* (2013.01)

(58) Field of Classification Search
CPC .............................. H04W 76/021; H04W 76/11
See application file for complete search history.

(56) References Cited

U.S. PATENT DOCUMENTS 8,582,529 B2 * 11/2013 Shaheen ........... H04W 36/0033
370/331
2008/0254768 A1 * 10/2008 Faccin .................. H04W 76/10
455/411
(Continued)

FOREIGN PATENT DOCUMENTS

CN 102238521 A 11/2011

OTHER PUBLICATIONS

Ericsson "Clarifications in the usage of the APN-AMBR" 3GPP TSG-SA WG2 Meeting #67, S2-085571, 2008, 16 pages.
(Continued)

*Primary Examiner* — Andrew Lai
*Assistant Examiner* — Andrew C Lee
(74) *Attorney, Agent, or Firm* — Rothwell, Figg, Ernst & Manbeck, P.C.

(57) ABSTRACT

There is provided mobile gateway selection performed by a PCRF node in communication with an MME node or an S4-SGSN. The mobile gateway selection is based on a direct MME/S4-SGSN-PCRF interface. A request message for a Packet Data Network Gateway Internet Protocol address to be used for establishing a session for a first user equipment is transmitted from the MME/S4-SGSN to a Policy and Charging Rules Function node through a direct MME/S4-SGSN-PCRF interface. The Policy and Charging Rules Function node determines a PDN GW IP address to be used for establishing the session based on policies for the first user equipment and transmits the PDN GW IP address through the direct MME/S4-SGSN-PCRF interface to the MME/S4-SGSN.

17 Claims, 9 Drawing Sheets

(51) Int. Cl.
  *H04L 12/14* (2006.01)
  *H04L 29/12* (2006.01)
  *H04W 88/02* (2009.01)

(56) References Cited

U.S. PATENT DOCUMENTS

| | | | |
|---|---|---|---|
| 2008/0316972 A1* | 12/2008 | Shaheen | H04W 36/0033 370/331 |
| 2009/0270099 A1* | 10/2009 | Gallagher | H04W 8/08 455/435.1 |
| 2009/0285183 A1* | 11/2009 | Wu | H04L 47/80 370/331 |
| 2010/0142399 A1* | 6/2010 | Hu | H04W 36/0044 370/252 |
| 2010/0217877 A1* | 8/2010 | Willars | H04W 4/24 709/228 |
| 2010/0235620 A1* | 9/2010 | Nylander | H04L 63/20 713/151 |
| 2010/0281170 A1* | 11/2010 | Rui | H04L 41/0893 709/227 |
| 2011/0007706 A1* | 1/2011 | Shaikh | H04W 28/16 370/331 |
| 2011/0099604 A1* | 4/2011 | Zhou | H04L 12/14 726/1 |
| 2011/0103310 A1* | 5/2011 | Stojanovski | H04L 12/66 370/328 |
| 2011/0268086 A1* | 11/2011 | Liang | H04W 36/0055 370/331 |
| 2011/0292896 A1* | 12/2011 | Yeuom | H04W 8/082 370/329 |
| 2011/0320580 A1* | 12/2011 | Zhou | H04L 12/14 709/223 |
| 2012/0008523 A1* | 1/2012 | Zhou | H04L 12/14 370/252 |
| 2012/0036366 A1* | 2/2012 | May | G06F 21/6209 713/176 |
| 2012/0063300 A1* | 3/2012 | Sahin | H04W 36/12 370/225 |
| 2012/0063437 A1* | 3/2012 | Liang | H04W 8/082 370/338 |
| 2012/0076047 A1* | 3/2012 | Turanyi | H04W 76/02 370/254 |
| 2012/0110197 A1* | 5/2012 | Miklos | H04W 36/12 709/228 |
| 2012/0117251 A1* | 5/2012 | Zhou | H04W 76/022 709/227 |
| 2012/0179790 A1* | 7/2012 | Kim | H04W 8/26 709/220 |
| 2012/0182972 A1* | 7/2012 | Guan | H04W 76/11 370/331 |
| 2012/0214492 A1* | 8/2012 | Mihaly | H04W 76/041 455/437 |
| 2012/0220326 A1* | 8/2012 | Li | H04W 4/005 455/509 |
| 2012/0224536 A1* | 9/2012 | Hahn | H04L 45/00 370/328 |
| 2012/0224564 A1* | 9/2012 | Paisal | H04N 7/148 370/331 |
| 2012/0246325 A1* | 9/2012 | Pancorbo Marcos | H04L 63/102 709/227 |
| 2013/0003699 A1* | 1/2013 | Liu | H04W 8/082 370/331 |
| 2013/0010756 A1* | 1/2013 | Liang | H04W 36/18 370/331 |
| 2013/0070775 A1* | 3/2013 | Qu | H04L 12/1407 370/401 |
| 2013/0083773 A1* | 4/2013 | Watfa | H04W 36/0033 370/331 |
| 2013/0107863 A1* | 5/2013 | Faccin | H04W 36/0022 370/331 |
| 2013/0115919 A1* | 5/2013 | Xu | H04W 12/06 455/411 |
| 2014/0031069 A1* | 1/2014 | Yang | H04W 68/00 455/458 |
| 2014/0059192 A1* | 2/2014 | Miklos | H04W 8/082 709/221 |
| 2014/0101726 A1* | 4/2014 | Gupta | H04N 21/2365 726/4 |
| 2014/0129839 A1* | 5/2014 | So | H04L 61/2514 713/171 |
| 2014/0146783 A1* | 5/2014 | Kim | H04W 48/20 370/329 |
| 2014/0192780 A1* | 7/2014 | Kim | H04W 48/08 370/331 |
| 2015/0180945 A1* | 6/2015 | Hall | H04W 4/20 709/203 |
| 2017/0289866 A1* | 10/2017 | Watfa | H04W 36/0033 |

OTHER PUBLICATIONS

Motorola "PCRF interactions with MME/UPE and SAE anchor" 3GPP TSG SA WG2 Architecture—SAE Ad-Hoc, S2-064248, 2006, 4 pages.

SA WG1, SA WG2, SA WG5 "Proposed New Study WID: Study on Usage Monitoring Control Enhancement (FS-UMONC)" TSG SA Meeting #51, SP-110434, 2011, 5 pages.

3GPP, 3rd Generation Partnership Project; Technical Specification Group Services and System Aspects; Service requirements for Machine-Type Communications (MTC); Stage 1 (Release 11), 3GPP TS 22.368 V11.4.0, 2012, 25 pages.

3GPP, 3rd Generation Partnership Project; Technical Specification Group Services and System Aspects; Policy and changing control architecture (Release 11), 3GPP TS 23.203 V11.5.0, 2012, 175 pages.

Chinese Office Action dated Mar. 5, 2018, issued in Chinese Patent Application No. 201380072026.0, 10 pages.

Second Chinese Office Action dated Oct. 15, 2018, issued in Chinese Patent Application No. 201380072026.0, 6 pages.

* cited by examiner

MOBILE GATEWAY SELECTION USING A DIRECT CONNECTION BETWEEN A PCRF NODE AND A MOBILITY MANAGEMENT NODE

CROSS REFERENCE TO RELATED APPLICATION(S)

This application is a 35 U.S.C. § 371 National Phase Entry Application from PCT/EP2013/052072, filed Feb. 1, 2013, designating the United States, the disclosure of which is incorporated herein in its entirety by reference.

TECHNICAL FIELD

Embodiments presented herein relate to mobile gateway selection, and particularly to mobile gateway selection performed by a PCRF node in communication with an MME node or an S4-SGSN.

BACKGROUND

In communication networks, there is always a challenge to obtain good performance and capacity for a given communications protocol, its parameters and the physical environment in which the communication network is deployed.

In a wireless communications network wireless radio terminals communicate via a Radio Access Network (RAN) to one or more core networks. The radio terminals may e.g. be a mobile station (MS) or a user equipment unit (UE) or similar, e.g. such as mobile telephones also known as "cellular" telephones, and laptops with wireless capability, and thus can be, for example, portable, pocket, hand-held, computer-comprised, or car-mounted mobile devices which communicate voice and/or data with radio access network.

A wireless network, illustratively a Long Term Evolution (LTE) communications network, may comprise groups of mobile telephones or other user equipment (UE) communicating with one or more eNodeBs, which communicate with one or more Serving Gateways (SGWs), which communicate with a Packet Data Network (PDN) Gateway (PGW), which communicates with fixed networks such as Internet Protocol (IP) Multimedia Subsystem (IMS) access networks or core networks. Additionally, the LTE network includes various network elements such as Mobility Management Entities (MMEs), a Policy and Charging Rules Function (PCRF), a network management system (NMS) and so on.

For example, the General Packet Radio Service (GPRS) is a wireless communication system, which evolved from the GSM. The GSM EDGE Radio Access Network (GERAN) is a radio access network for enabling radio terminals to communicate with one or more core networks. A UE or a MS may interact with GPRS using the GERAN radio access and the UTRAN radio access. The UE-related and/or MS-related control signaling is handled by the Serving GPRS Support Node (SGSN) with support of subscription information provided by the Home Subscriber Server (HSS).

An Access Point Name (APN) is the name of a gateway between a GPRS (or 3GPP, etc) mobile network and another computer network, frequently the public Internet. The PDN gateway (commonly denoted PDN GW or PGW) of a PDN connection for a certain APN is determined by a mechanism called APN resolution. APN resolution is the process of Domain Name System (DNS) look up to determine the IP address of the PDN-GW that provides connectivity to the PDN identified by the APN. When a UE initiates a new PDN connection, it provides the APN to which it wants to connect to in the initial UE request sent to the network. The SGSN or the MME (depending on if the access is LTE or UTRAN/GERAN) checks the provided APN against the user subscription record it has previously obtained from the HLR/HSS when the UE/MS first attached, and then sends a recursive DNS Query to a DNS server that returns the PDN-GW IP address.

It some scenarios it is desired, or even necessary, to force all active sessions of a single user or a group of users to go through the same mobile core GW.

Hence, there is still a need for an improved GW selection.

SUMMARY

An object of embodiments herein is to provide improved GW selection.

The inventors of the enclosed embodiments have realized that a negotiation mechanism for GW selection may be defined between the SGSN or MME at one end and the PCRF at the other end. The enclosed embodiments are hence based on a direct interface defined between the MME/S4-SGSN and the PCRF. This interface could be similar to the Gxx interface.

According to a first aspect there is presented a method for mobile gateway, GW, selection. The method of the first aspect is performed by a Mobility Management Entity, MME, node or an S4-SGSN. The method comprises transmitting a request message for a Packet Data Network, PDN, Gateway, GW, Internet Protocol, IP, address to be used for establishing a session for a first user equipment, UE, to a Policy and Charging Rules Function, PCRF, node through a direct MME/S4-SGSN-PCRF interface. The method comprises receiving a confirmation message comprising a PDN GW IP address to be used for establishing the session from the PCRF node through the direct MME/S4-SGSN-PCRF interface.

According to a second aspect there is presented a method for mobile gateway, GW, selection. The method of the second aspect is performed by a Policy and Charging Rules Function, PCRF, node. The method comprises receiving a request message for a Packet Data Network, PDN, Gateway, GW, Internet Protocol, IP, address to be used for establishing a session for a first user equipment, UE, from a Mobility Management Entity, MME, node or an S4-SGSN through a direct MME/S4-SGSN-PCRF interface. The method comprises determining a PDN GW IP address to be used for establishing the session based on policies for the first UE. The method comprises transmitting the PDN GW IP address to be used for establishing the session to said MME node or said S4-SGSN through the direct MME/S4-SGSN-PCRF interface.

Advantageously this provides dynamic mechanisms for mobile GW selection which allows consideration of more advanced factors than DNS resolution alone.

Advantageously, the disclosed mechanisms enable new use cases e.g. for PCC and machine-to-machine (M2M) communications where a common Policy and Charging Enforcement Function (PCEF) shall be selected for a group of sessions in order to enable e.g. enforcement of a common maximum bandwidth, monitoring of common usage quota, etc. The disclosed mechanisms may also guarantees that a common GW can be selected both for WiFi and 3GPP accesses in fixed mobile converged sessions.

According to a third aspect there is presented a Mobility Management Entity, MME, node or an S4-SGSN for mobile gateway, GW, selection. The MME/S4-SGSN comprises an input/output, I/O, interface arranged to transmit a request message for a Packet Data Network, PDN, Gateway, GW, Internet Protocol, IP, address to be used for establishing a session for a first user equipment, UE, to a Policy and Charging Rules Function, PCRF, node through a direct MME/S4-SGSN-PCRF interface. The I/O interface is further arranged to receive a confirmation message comprising a PDN GW IP address to be used for establishing the session from the PCRF node through the direct MME/S4-SGSN-PCRF interface.

According to a fourth aspect there is presented a Policy and Charging Rules Function, PCRF, node for mobile gateway, GW, selection. The PCRF node comprises an input/output, I/O, interface arranged to receive a request message for a Packet Data Network, PDN, Gateway, GW, Internet Protocol, IP, address to be used for establishing a session for a first user equipment, UE, from a Mobility Management Entity, MME, node or an S4-SGSN through a direct MME/S4-SGSN-PCRF interface. The PCRF node comprises a processing unit arranged to determine a PDN GW IP address to be used for establishing the session based on policies for the first UE. The I/O interface is further arranged to transmit the PDN GW IP address to be used for establishing the session to said MME node or said S4-SGSN through the direct MME/S4-SGSN-PCRF interface.

According to a fifth aspect there is presented a computer program for mobile gateway, GW, selection, the computer program comprising computer program code which, when run on a MME/S4-SGSN, causes the MME/S4-SGSN to perform a method according to the first aspect.

According to a sixth aspect there is presented a computer program for mobile gateway, GW, selection, the computer program comprising computer program code which, when run on a PCRF node, causes the PCRF node to perform a method according to the second aspect.

According to a seventh aspect there is presented a computer program product comprising a computer program according to at least one of the fifth aspect and the sixth aspect, and a computer readable means on which the at least one computer program is stored.

It is to be noted that any feature of the first, second, third, fourth, fifth, sixth, and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The disclosed embodiments are now described, by way of example, with reference to the accompanying drawings, in which.

DETAILED DESCRIPTION

The present disclosure will now be described more fully hereinafter with reference to the accompanying drawings, in which certain embodiments are shown. The present disclosure may, however, be embodied in many different forms and should not be construed as limited to the embodiments set forth herein; rather, these embodiments are provided by way of example so that this disclosure will be thorough and complete, and will fully convey the scope of the disclosed concepts to those skilled in the art. Like numbers refer to like elements throughout the description.

Figure 1:
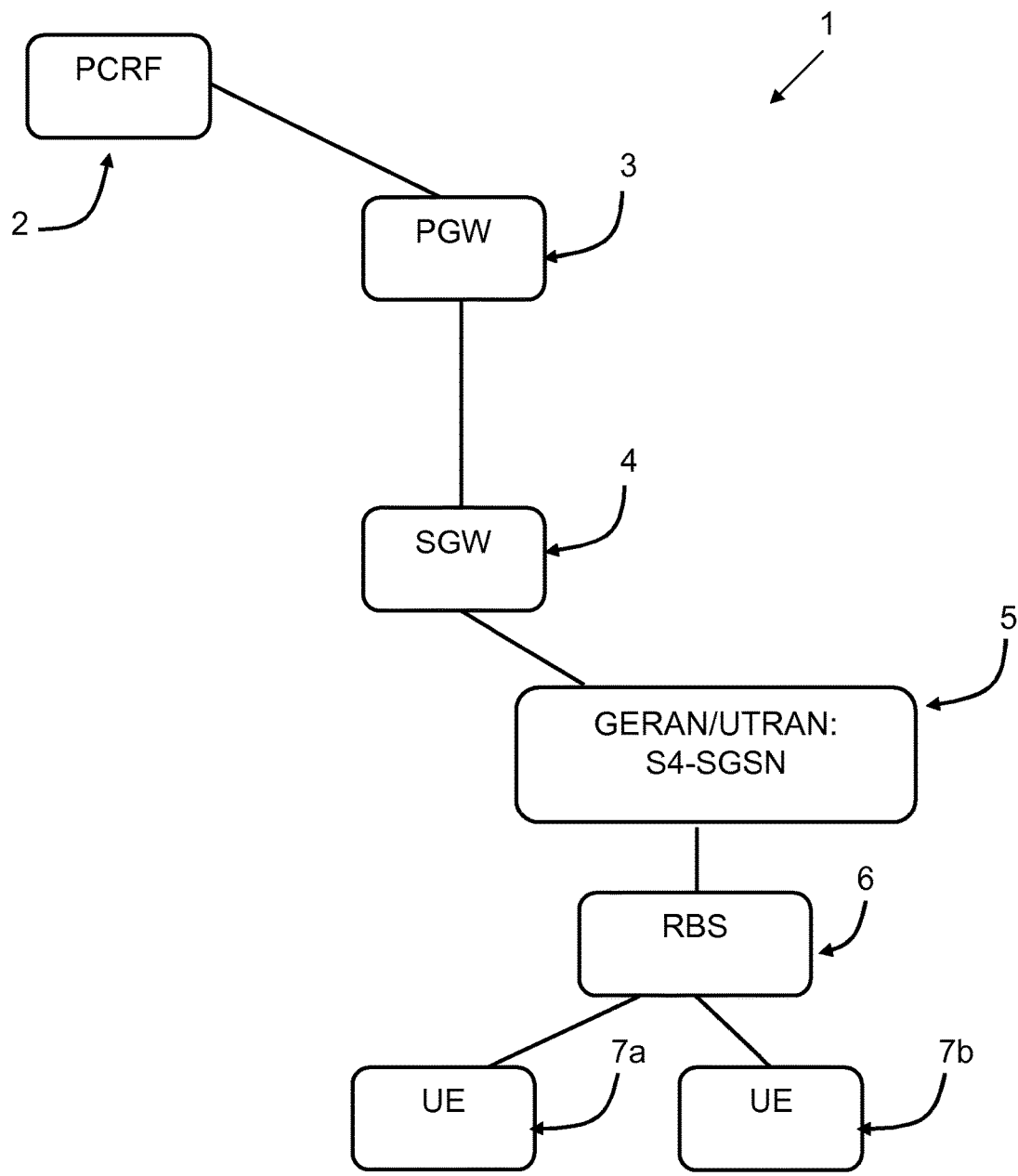
FIGS. 1 and 2 are schematic diagrams illustrating wireless networks where embodiments presented herein may be applied.

FIG. 1 shows a schematic view of a first wireless network 1 in which the enclosed embodiments may be applied. The first wireless network 1 is a so called 2G/3G system, also sometimes referred to as a GERAN/UTRAN system. As shown, the first wireless network 1 can accommodate a number of user equipment (UE), of which two are illustrated at reference numbers 7*a*, 7*b*. In general terms, the first wireless network 1 may be arranged to accommodate a plurality UEs.

All traffic to and from the UE 7*a*, 7*b* is routed via a so called "base station", which, depending on the nature of the wireless network used, has different names. In the case of a GERAN/UTRAN system such as the one schematically illustrated in FIG. 13, the base station is referred to by the generic name "Radio Base Station" (RBS). One RBS which the UE 7*a*, 7*b* in an operating state is arranged to be operatively connected to is in FIG. 1 illustrated as RBS 6. One example of a system specific name for an RBS is NodeB, as used in 3G systems, and another example is BTS, Base Transceiver System, as used in some 2G systems.

Regardless of the type of wireless network, the mobility of the UE 7*a*, 7*b* is controlled by what will here initially be referred to generically as a "mobility management node", which, as shown in FIG. 1, in the case of GERAN/UTRAN is a so called S4-SGSN 5.

The "mobility management node" is operatively connected to a Serving Gateway (SGW) 4, which in turn is operatively connected to a PDN Gateway (PGW) 3. The PGW 3 can be operatively connected to a unit or a function for Policy and Charging Rules Function, a so called PCRF node 2. Alternatively the PGW 3 can be arranged to take certain policy and charging actions on its own without the use of a PCRF node 2.

Figure 2:
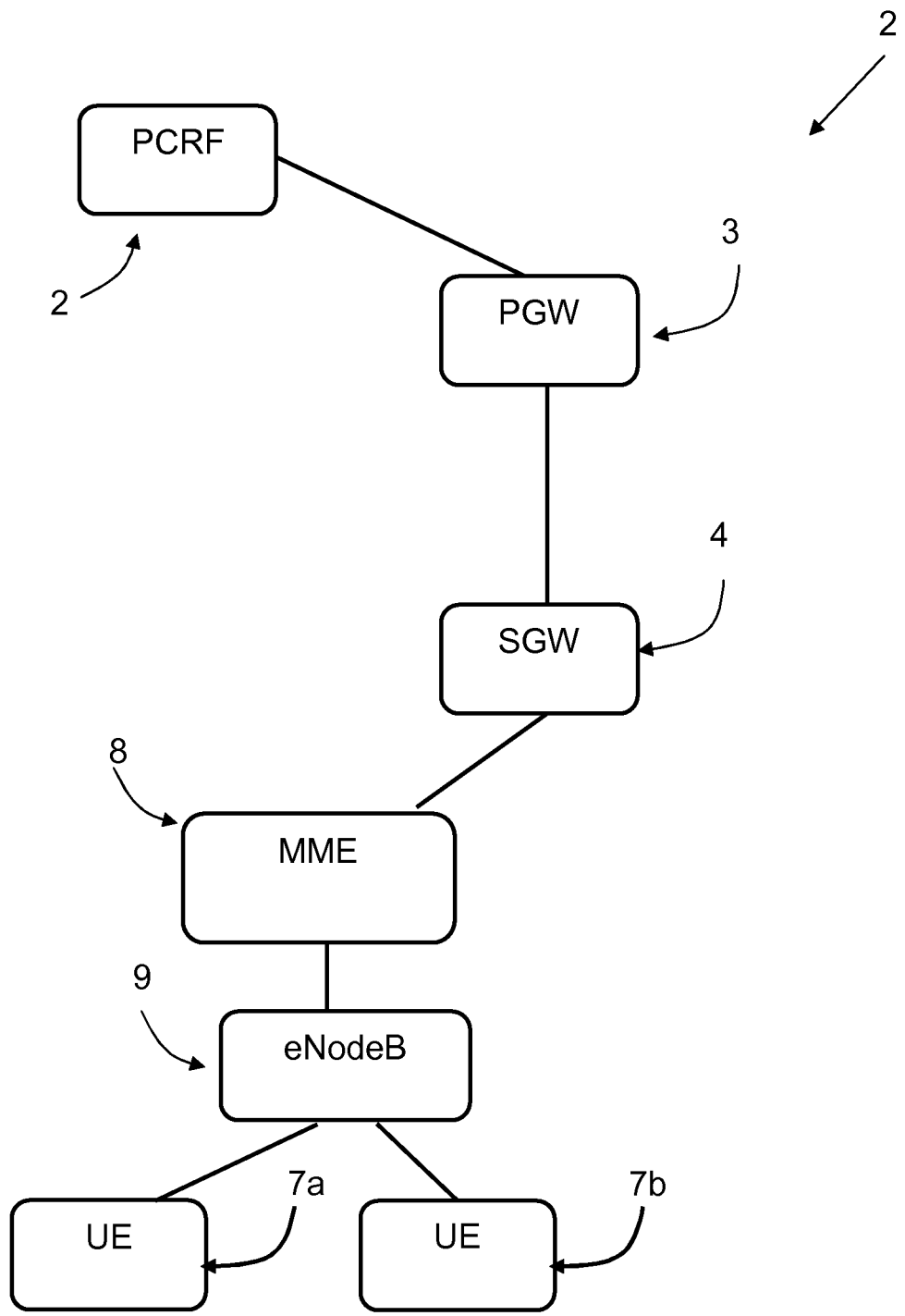

FIG. 2 shows a schematic overview of a second wireless network 2 in which the enclosed embodiments may be applied. The second wireless network 2 is a so called LTE based system, also referred to as a EUTRAN system. It should be pointed out that the terms "LTE" and "LTE based" system is here used to include both present and future LTE based systems, such as, for example, advanced LTE systems.

In a EUTRAN system such as the wireless network 2 in FIG. 2, the "base station" is referred to as an eNodeB 9. The "mobility management node" is in a EUTRAN system referred to as a Mobility Management Entity (MME) 8. As in the first wireless network 1 of FIG. 1 the second wireless network 2 of FIG. 2 further comprises a SGW 4, a PGW 3 and a PCRF node 2. One or more UEs 7a, 7b may in an operating state of the wireless network 2 be operatively connected to the eNodeB 9.

Figure 4:
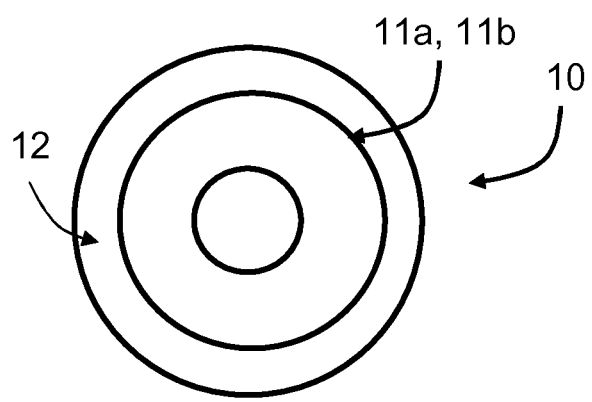
FIG. 4 shows one example of a computer program product comprising computer readable means.

It should be appreciated that although FIG. 1 shows a first wireless network 1 which is a GERAN/UTRAN based system and FIG. 4 shows a second wireless network 2 which is an EUTRAN based system, the enclosed embodiments can also be applied in systems and wireless networks which combine these two technologies, i.e. combined GERAN/UTRAN and EUTRAN systems.

Figure 3:
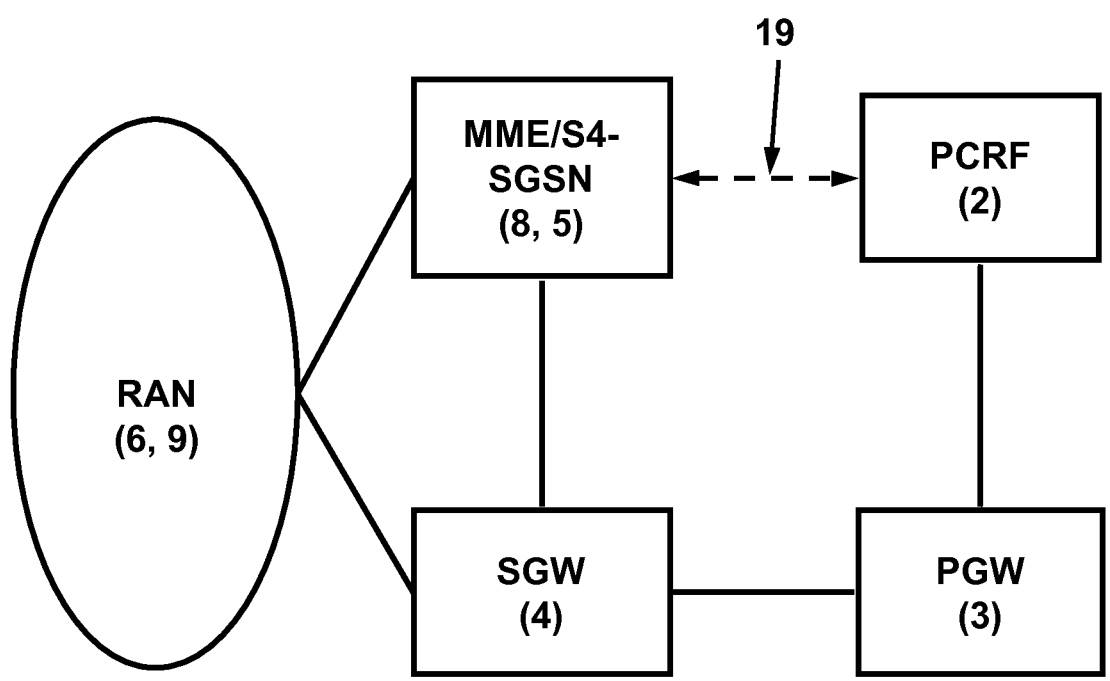
FIG. 3 schematically illustrates a MME/S4-SGSN-PCRF interface according to some example embodiments.

FIG. 3 schematically illustrates a part of the first wireless network 1 of FIG. 1 or a part of the second wireless network 2 of FIG. 2. As schematically illustrated in FIG. 3 there is provided a direct MME/S4-SGSN-PCRF interface 19 between the MME/S4-SGSN 8, 5 and the PCRF node 2. This interface 19 could be similar to the Gxx interface commonly used between a PCRF and a Bearer Binding and Event Reporting Function (BBERF) (but may also inherit functions from any or a combination of the interfaces Rx (commonly used between a PCRF and an Application function (AF)), Sd (commonly used between a PCRF and a Traffic Detection Function (TDF), and S6a (between an MME and an HSS)).

The PCRF (Policy Control and Charging Rules Function) is a functional element that encompasses policy control decision and flow based charging control functionalities. The PCRF provides network control regarding the service data flow detection, gating, QoS (Quality of Service) and flow based charging (except credit management) towards the PCEF. The PCRF receives session and media related information from the Application Function (AF) and informs AF of traffic plane events.

The PCRF shall provision Policy and Charging Control (PCC) Rules to the PCEF via the Gx reference point. PCC was originally introduced in 3GPP standards as a mean to secure resources in the access network mainly for dynamic services (such as IMS, IP Multimedia Subsystem), but also to control resource consumption for regular Internet services (P2P-traffic, web-browsing, FTP etc.) and to enable Flow Based Charging (FBC).

According to 3GPP related standards, the PCRF shall inform the PCEF through the use of PCC rules on the treatment of each service data flow that is under PCC control, in accordance with the PCRF policy decision(s).

The AF is an element offering applications in which service is delivered in a different layer (i.e. transport layer) from the one the service has been requested (i.e. signaling layer), the control of IP bearer resources according to what has been negotiated. One example of an AF is the P-CSCF of the IP Multimedia Core Network (IM CN) subsystem. A Proxy Call Session Control Function (P-CSCF) is a SIP (Session Initiation Protocol) proxy that is the first point of contact for the IMS terminal.

According to 3GPP related standards, the AF shall communicate with the PCRF to transfer dynamic session information (i.e. description of the media to be delivered in the transport layer). This communication is performed using the Rx interface.

The PCEF encompasses service data flow detection (based on filter definitions included in the PCC rules), as well as online and offline charging interactions and policy enforcement. Since the PCEF is the system element handling the bearers this is where the QoS is being enforced for the bearer according to the QoS information coming from the PCRF. This functional entity is located at the mobile gateway (e.g. GGSN in the GPRS case, PGW in the EPS case and PDG in the WLAN case). For the cases where there is PMIP (Proxy Mobile IPv6) instead of GPRS Tunneling Protocol (GTP) between the Bearer Binding and Event Reporting Function (BBERF) and the PCEF, the bearer control is instead performed in the BBERF acting as a mobile gateway.

Mobile Core GW Selection

Mobile Core Gateway Selection when a UE Connects to a Network by Cellular Radio Connectivity:

As noted above, the PDN-Gateway of a PDN connection for a certain APN is determined by a mechanism called APN resolution. As also noted above the SGSN or the MME (depending on if the access is LTE or UTRAN/GERAN) checks the provided APN against the user subscription record it has previously obtained from the HLR/HSS when the UE/MS first attached, and then sends a recursive DNS Query to a DNS server that returns the PDN-GW IP address.

In general terms, the SGSN is responsible for the delivery of data packets from and to the radio terminals (such as mobile stations, user equipment, etc.) within its geographical service area. Its tasks include packet routing and transfer, mobility management (attach/detach and location management), logical link management, and authentication and charging functions. The location register of the SGSN stores location information (e.g., current cell, current Visitor Location Register (VLR)) and user profiles (e.g., International Mobile Station Identity (IMSI), address(es) used in the packet data network) of all GPRS users registered with this SGSN.

In general terms, the MME is a key control-node for the LTE access network. The MME is responsible for idle mode UE (User Equipment) tracking and paging procedure including retransmissions. It is involved in the bearer activation/deactivation process and is also responsible for choosing the SGW for a UE at the initial attach and at time of intra-LTE handover involving Core Network (CN) node relocation. It is responsible for authenticating the user (by interacting with the HSS).

Mobile Core Gw Selection when a UE Connects to a Network by a Non-Cellular Radio Connectivity, Such as a Wireless Local Area Network Connectivity:

As is known in the state of the art a UE may be arranged to access a non-cellular radio network, such as a wireless local area network. Service delivery may be enabled through the use of mobile packet gateway components.

WiFi is an example of a wireless local area network. Such access may thus permit WiFi users to access the same services and to receive the same user experiences available for today's 2G/3G/4G mobile broadband users. This means availability of all the operator contents and services as well as OTT (over the top) services regardless where the subscribers are, and with whatever access network they are using (2G/3G/4G or WiFi). Such access may further enable reuse of the mobile infrastructure, leveraging on the investment of the cellular radio network. Two examples are the DPI (deep packet inspection) functionality of the GW and the charging infrastructure.

When a cellular radio network UE accesses the network through a non-cellular radio network access, a GPRS Tunneling Protocol (GTP) is used to establish communication between the non-cellular radio network GW and the mobile core GW. In this way the UE is allocated an IP address from the mobile packet core GW and has access to the services offered by the mobile operator.

It some scenarios it is desired or even necessary to force all active sessions of a single user or a group of users to go through the same mobile core GW. A number of exemplary scenarios will be described next. However, as the skilled person understands, these are just a few examples of many wherein it may be desired or even necessary to force all active sessions of a single user or a group of users to go through the same mobile core GW and where the enclosed embodiments may be applied.

Scenario 1: Usage Monitoring of Group of Users:

Employees of a company may share a common usage limit. For such scenarios the PCRF could send to the PCEF a usage monitoring key that applies at group level, i.e. it is shared between all the UEs belonging to this group. The PCEF residing in the mobile core GW may monitor the usage of all sessions associated with this monitoring key. When the quota (i.e. the common usage limit) is surpassed the PCEF may report the usage to the PCRF. In order to make this scenario feasible, all the sessions of the users sharing a common limit may be required to go through the same mobile core GW. This allows a single common GW to monitor the common usage limit for all sessions associated with the monitoring key.

Scenario 2: Maximum Bandwidth for a Group of Users:

If a number of UEs and/or user accounts belong to a group for which the operator defines certain maximum bandwidth limit shared by all the members of the group, the network may be able to control that all the active sessions of these UEs and/or user accounts do not surpassed the defined bandwidth limit. This may be difficult to control if there is not a common enforcement point for all these active sessions. Some examples of this type of scenario are employees of a company sharing a common bandwidth limit, or in the context of machine-to-machine communications, a group of devices belonging to certain service provider, e.g. electricity meters of an electrical company.

Scenario 3: Fixed Mobile Convergence Scenarios:

In order to apply converged policies, a common policy enforcement point for fixed and mobile sessions could be desired or needed.

As the skilled person understands, the above mentioned scenarios are just example of typical scenarios, and the herein disclosed subject matter is equally applicable to other scenarios or a combination of two or more scenarios. For example, usage monitoring may be readily combined with maximum bandwidth considerations and/or fixed mobile convergence by considering a plurality of policy parameters during GW determination, see step S203 below.

As mentioned above, the SGSN or the MME, based on the APN obtained from the HLR/HSS when the MS is attached, transmits a DNS Query to a DNS server that returns the PDN GW IP address. In this procedure (which procedure is known in the state of the art) it is not possible to assure that for a set of sessions initiated by a group of UEs and/or user accounts, the same mobile GW is selected.

Further, in the context of fixed mobile convergence, assume that a certain UE has established a PDN-connection/PDP-context towards a certain mobile core GW (PDN GW). If the same UE initiates a second session from a WiFi access, the PCRF could, according to procedures available in the state of the art, potentially force the GW selection for the WiFi access to the same mobile core GW that is used by the existing PDN-connection and/or PDP-context for the 3GPP access by using authentication and authorization procedures as required for fixed access. However, this is not possible for the other way around. Assume that the UE has first initiated a WiFi session and that certain mobile core GW has been selected for the WiFi session. If the UE then requests a second session, this time through a 3GPP access and whilst the first session is still on-going, the PCRF would not be able to force the GW selection for the 3GPP access to the same mobile GW as for the WiFi session. The reason for this is that according to the state of the art the PCRF is not involved in the APN resolution process performed by the MME/SGSN.

The embodiments disclosed herein relate to improved mobile gateway, GW, selection. In order to obtain improved mobile GW selection there is provided a first network node 5, 8 (see e.g. FIG. 3), a method performed in the first network node 5, 8, a second network node 2, a method performed in the second network node 2, a computer program comprising code, for example in the form of a computer program product, that when run on the first network node 5, 8 causes the first network node 5, 8 to perform the method, and a computer program comprising code, for example in the form of a computer program product, that when run on the second network node 2 causes the second network node 2 to perform the method.

Figure 5:
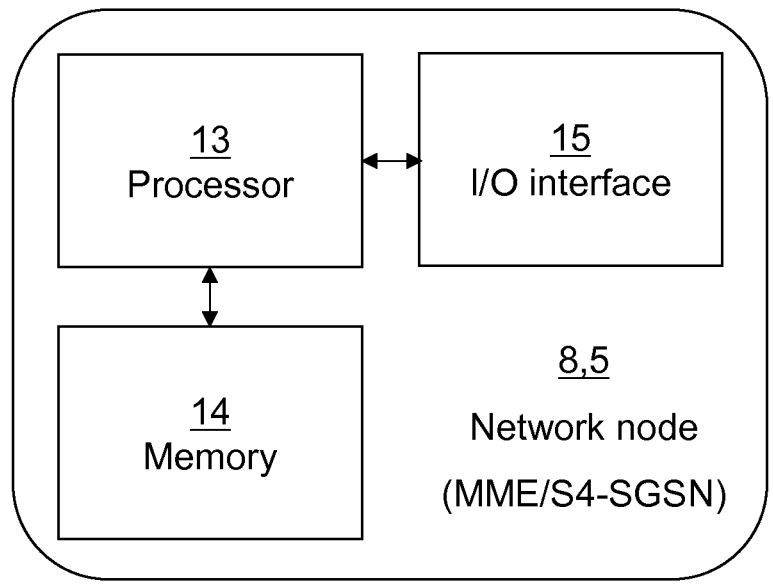
FIGS. 5 and 6 are schematic diagrams showing functional modules of network nodes.

FIG. 5 schematically illustrates, in terms of a number of functional modules, the components of a first network node 5, 8. The first network node 5, 8 may be either a Mobility Management Entity (MME) node 8 or an S4 interface Serving GPRS (General Packet Radio Service) support node (S4-SGSN) 5. A processing unit 13 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product to (as in FIG. 4), e.g. in the form of a memory 14. Thus the processing unit 13 is thereby arranged to execute methods as herein disclosed. The memory 14 may also comprise persistent storage, which, for example, can be any single one or combination of magnetic memory, optical memory, solid state memory or even remotely mounted memory. The first network node 5, 8 further comprises at least one input/output (I/O) interface 15 for receiving and providing information to other entities and devices, such as other network nodes 2. The processing unit 13 controls the general operation of the first network node 5, 8, e.g. by sending control signals to the I/O interface 15 and receiving reports from the I/O interface 15 of its operation. Other components, as well as the related functionality, of the first network node 5, 8 are omitted in order not to obscure the concepts presented herein.

Figure 6:
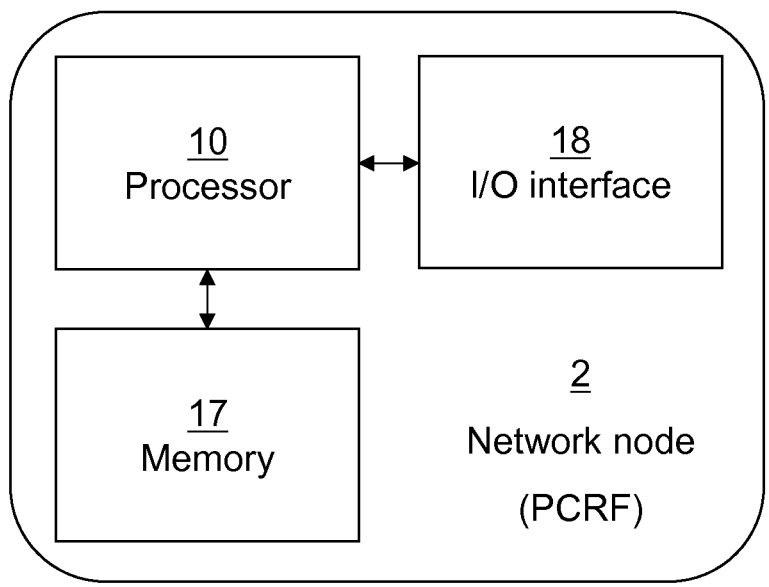

FIG. 6 schematically illustrates, in terms of a number of functional modules, the components of a second network node 2. The second network node 2 may be a Policy and Charging Rules Function (PCRF) node 2. A processing unit 16 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 10 (as in FIG. 4), e.g. in the form of a memory 17. Thus the processing unit 16 is thereby arranged to execute methods as herein disclosed. The memory 17 may also comprise persistent storage, which, for example, can be any single one or combination of magnetic memory, optical memory, solid state memory or even remotely mounted memory. The second network node 2 further comprises at least one input/output (I/O) interface 18 for receiving and providing information to other entities and devices, such as other network nodes 5, 8. The processing unit 16 controls the general operation of the second network node 2, e.g. by sending control signals to the I/O interface 18 and receiving reports from the I/O interface 18 of its operation. Other components, as well as the related functionality, of the second network node 2 are omitted in order not to obscure the concepts presented herein.

Figure 10:
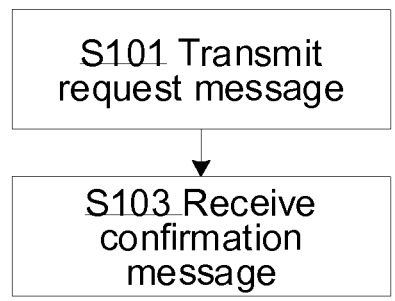
FIGS. 10, 11, 12 and 13 are flowcharts of methods according to embodiments.
Figure 11:
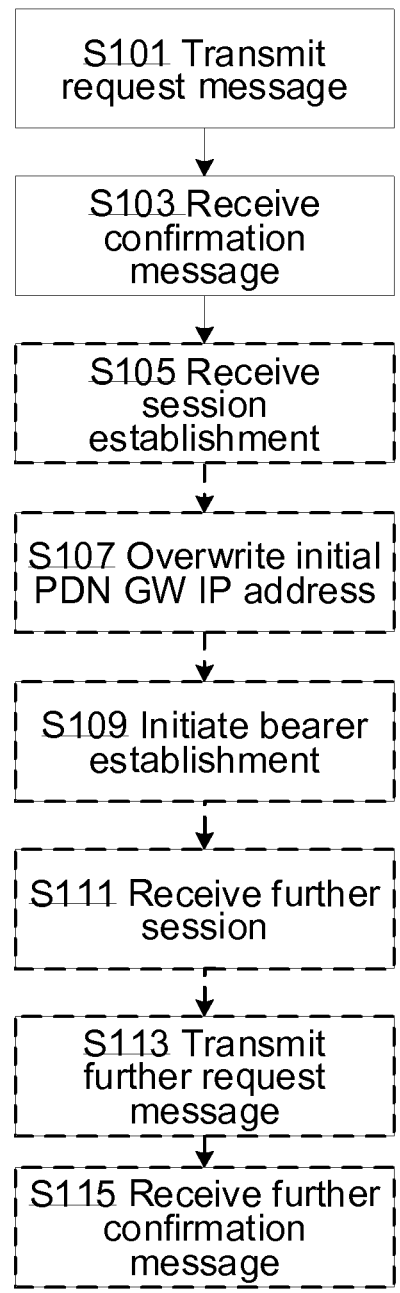
Figure 12:
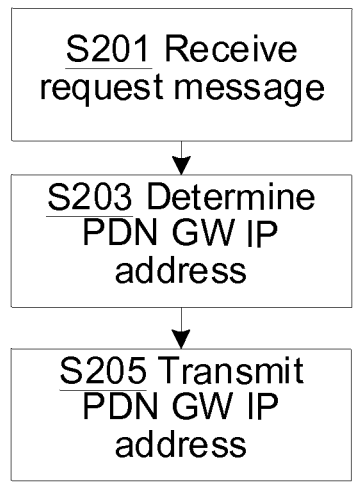
Figure 13:
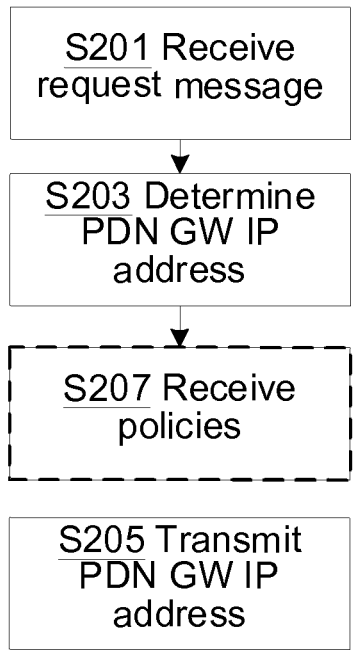

FIGS. 10-13 are flow charts illustrating embodiments of methods of mobile gateway (GW) selection. The methods of FIGS. 10 and 11 are performed in the first network node 5, 8. The methods of FIGS. 12 and 13 are performed in the second network node 2. The methods are advantageously provided as computer programs 11a, 11b. FIG. 4 shows one example of a computer program product 10 comprising computer readable means 12. On this computer readable means 12, at least one computer program 11a can be stored, which computer program 11a can cause the first network node 5, 8 to execute methods according to embodiments described herein, and at least one computer program 11b can be stored, which computer program 11b can cause the second network node 2 to execute methods according to embodiments described herein. In the example of FIG. 4, the computer program product 10 is illustrated as an optical disc, such as a CD (compact disc) or a DVD (digital versatile disc) or a Blu-Ray disc. The computer program product 10 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the at least one computer program 11a, 11b is here schematically shown as a track on the depicted optical disk, the at least one computer program 11a, 11b can be stored in any way which is suitable for the computer program product 10.

In general terms, the proposed mechanisms according to the herein disclosed embodiments are based on the MME or S4-SGSN initiating, upon receiving PDN Connectivity Request/Attach, a communication towards the PCRF with the purpose to retrieve the PDN GW IP address to be used in this PDN connection. Particularly, a method for mobile gateway, GW, selection comprises transmitting, in a step S101, a request message for a Packet Data Network (PDN) Gateway (GW) Internet Protocol (IP) address (PDN GW IP address) to be used for establishing a session for a first user equipment (UE) 7a. The request message is transmitted by the MME node 8 or the S4-SGSN 5 to a Policy and Charging Rules Function, PCRF, node 2 through a direct MME/S4-SGSN-PCRF interface 19. According to embodiments, the PDN GW IP address shall provide the PDN with connectivity for an IP Connectivity Access Network, CAN, session established by the UE 7a. It may here be assumed that when the request message is transmitted there are not any on-going sessions for the UE 7a. Hence the request message may be regarded as a first request message for the first UE 7a. Scenarios where further request messages are transmitted (i.e., situations where there is at least one on-going session when the request is transmitted) will be disclosed below.

The request may comprise an initial PDN GW IP address for the session. The MME/S4-SGSN 8, 5 may provide to the PCRF node 2 the PDN-GW address obtained in DNS resolution as disclosed above. Particularly, the MME/S4-SGSN 8, 5 may be arranged to, in a step S105, receive a session establishment request for the first UE 7a prior to transmitting the request message in step S101. The initial address may be obtained from the session establishment request.

As noted above the request is transmitted from the MME/S4-SGSN 8, 5 to the PCRF node 2. A method for mobile gateway, GW, selection therefore comprises receiving in the PCRF node 2, in a step S201, the request message for the request message for a Packet Data Network (PDN) Gateway (GW) Internet Protocol (IP) address (PDN GW IP address) to be used for establishing the session for the first user equipment (UE) 7a. The request message is received from the MME node 8 or the S4-SGSN 5 through the direct MME/S4-SGSN-PCRF interface 19.

The PCRF node 2 will, based on policies, decide the PDN-GW as (defined by its PDN GW IP address) to be used for the PDN connection. The PCRF node 2 is therefore arranged to, in a step S203, determine a PDN GW IP address to be used for establishing the session based on policies for the first UE 7a. The policies may be stored in a Subscription Profile Repository (SPR). The PCRF node 2 may therefore be arranged to, in a step S207, retrieve the policies from the SPR or from parameters of the RADIUS protocol.

The PCRF node 2 may optionally decide the PDN-GW to be used for the PDN connection also by considering user subscription information, information received from the MME/S4-SGSN 8, 5, such as UE location information, and information relating to any on-going sessions of the same user account or of other users associated with this user account. Thus, the UE 7a may be associated with at least one user account. The policies may comprise information relating to at least one of user subscription information of the user account, UE location, on-going sessions of the user account and/or UE 7a, or of other user account and/or UE 7b associated with the user account, and a maximum bandwidth allowed for the user account and/or UE 7a. Associations may correspond to a group defined for the UE 7a in the SPR. Particularly, the PDN GW IP address to be used may be determined such that a common PDN GW IP address is to be used for a wireless local area network connectivity session, such as a WiFi session, and a cellular radio connectivity session, such as a 3GPP or LTE session, for the UE 7a.

As noted above, the request transmitted by the MME/S4-SGSN 8, 5 may comprise an initial PDN GW IP address. The PDN GW IP address to be used may by the PCRF node 2 be determined to be either identical to or different from the initial PDN GW IP address.

Upon having determined the PDN GW IP address to be used, the PCRF node 2 transmits the PDN GW IP address to the MME node 8 or the S4-SGSN 5 which sent the request for the PDN GW IP address. Thus, the PCRF node 2 is arranged to, in a step S205, transmit the PDN GW IP address to be used for establishing the session to the MME node 8 or the S4-SGSN 5. The PDN GW IP address is by the PCRF node 2 transmitted through the direct MME/S4-SGSN-PCRF interface 19. The PDN GW IP address is thus received by the MME node 8 or the S4-SGSN 5. Hence, the MME node 8 or the S4-SGSN 5 is arranged to, in a step S103, receive a confirmation message comprising the PDN GW IP address to be used for establishing the session from the PCRF node 2 through the direct MME/S4-SGSN-PCRF interface 19.

As noted above, the PCRF node 2 may decide a different PDN-GW address or it could accept the received one. The MME/S4-SGSN 8, 5 may then overwrite the PDN-GW address received from DNS resolution procedure with the PDN-GW address obtained from the PCRF node 2. Thus, the MME/S4-SGSN 8, 5 may be arranged to, in a step S107, overwrite the initial PDN GW IP address in case the PDN GW IP address to be used is different from the initial PDN GW IP address.

Upon having received the PDN GW IP address to be used the session may be established. Particularly, the MME/S4-SGSN 8, 5 may be arranged to, in a step S109, initiate a bearer establishment towards the GW identified by the PDN GW IP address to be used by the first UE 7a.

As will be further disclosed below, the same PDN GW IP address may be used for subsequent sessions. Particularly, the MME/S4-SGSN 8, 5 may be arranged to, in a step S111, receive a further session establishment request. The further session establishment request relates either to the first UE 7a or to a further (i.e., another) UE 7b associated with the first UE 7a. How the first UE 7a and the further UE 7b may be associated have been disclosed above. By definition, the further session establishment request is assumed to be received after the bearer establishment in step S109 has been initiated. The MME/S4-SGSN 8, 5 may be arranged to, as a result thereof, in a step S113, transmit a further request message for a PDN GW IP address to be used for establishing a further session for the UE 7a, 7b from which the further session establishment request in step S111 was received; that is, either from the first UE 7a or from the further UE 7b. The further request message is transmitted by the MME/S4-SGSN 8, 5 to the PCRF node 2 through the direct MME/S4-SGSN-PCRF interface 19.

As in step S201, the request message for the further session is received by the PCRF node 2. As in step S203 the PCRF node 2 is arranged to determine a PDN GW IP address to be used for establishing the further session based on policies for the UE identified in the request message; that is, either the first UE 7a or the further UE 7b. The PDN GW IP address for the further session is determined by the PCRF node 2 to be identical to the PDN GW IP address of the confirmation message transmitted in step S205.

As in step S205 the PCRF node 2 is then arranged to transmit the PDN GW IP address to be used for establishing the further session to the MME node 8 or the S4-SGSN 5. The PDN GW IP address is transmitted by the PCRF node 2 through the direct MME/S4-SGSN-PCRF interface 19. The PDN GW IP address is thus received by the MME node 8 or the S4-SGSN 5. Hence, the MME node 8 or the S4-SGSN 5 is arranged to, in a step S115, receive a further confirmation message comprising the determined PDN GW IP address (which is identical to the PDN GW IP address of the confirmation message transmitted in step S205) to be used for establishing the further session from the PCRF node 2 through the direct MME/S4-SGSN-PCRF interface 19.

Three particular non-limiting embodiments relating to how mobile GW selection may be performed will now be described in more detail.

Embodiment A

Figure 7:
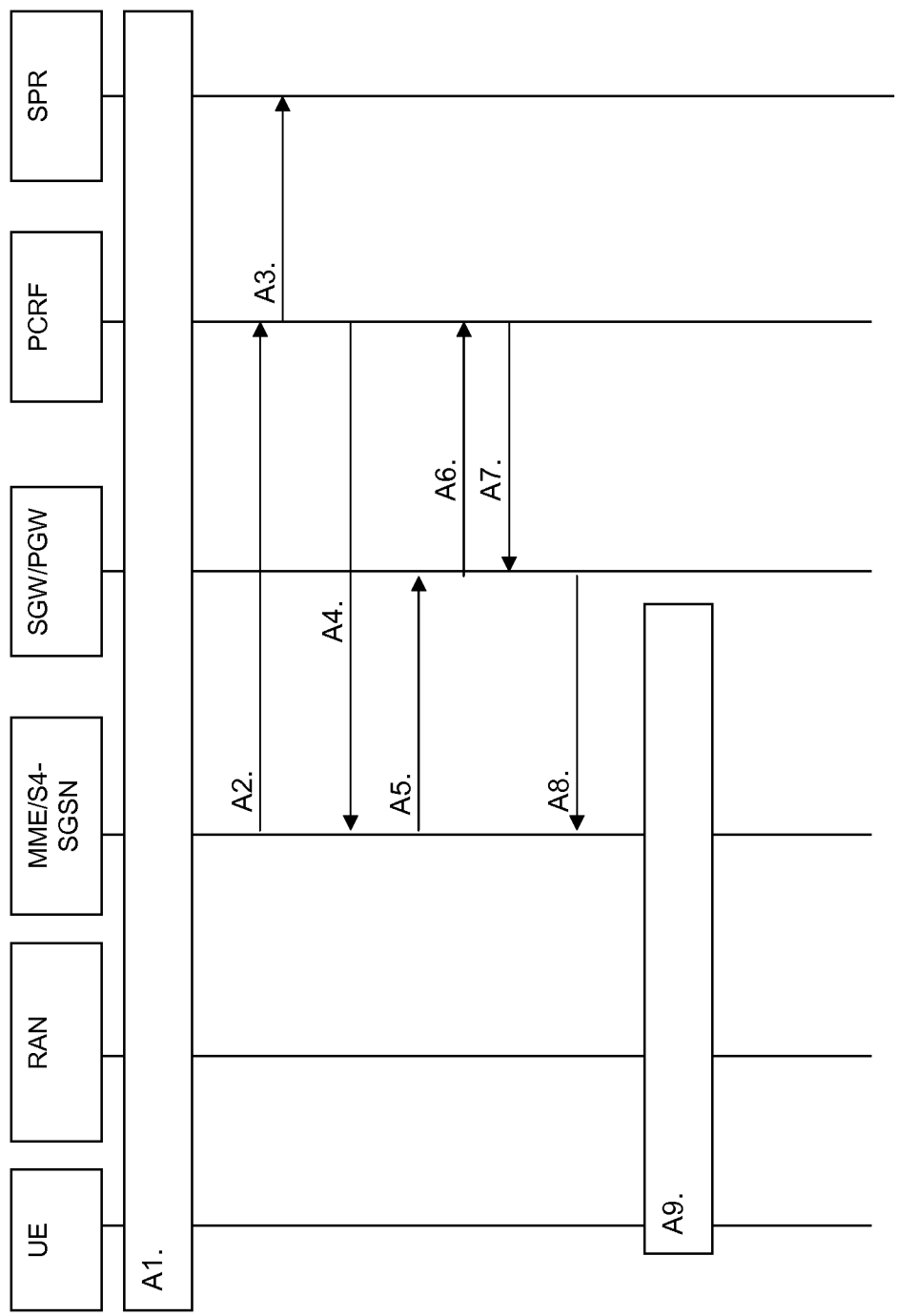
FIGS. 7, 8 and 9 are message sequence diagrams according to embodiments.

FIG. 7 illustrates how mobile GW selection may be performed according to a first non-limiting embodiment. In essence, this embodiment relates to an Attach and/or UE Requested PDN Connectivity and/or Primary PDP-context activation. A1-A9 denotes the steps performed according to the present embodiment.

A1: A first UE 7a initiates an Attach/PDN Connectivity/Primary PDP-context procedure. The MME node 8 or S4-SGSN 5 receives the PDN GW IP address as part of the DNS resolution process based on the APN, see step S105.

A2: The PDN GW IP address is forwarded by the MME/S4-SGSN 8, 5 to the PCRF node 2 over a direct interface 19, see steps S101 and S201.

A3: The PCRF node 2 based on policies and considering subscription information (e.g. retrieved from the SPR), determines the PDN GW IP address to be used for the PDN connection, see steps S203 and S207. The PCRF node 2 considers for this determination if the UE 7a has other sessions already established and if the UE 7a is associated with other UEs 7b with on-going sessions.

A4: The PCRF node 2 transmits the determined PDN GW IP address to the MME/S4-SGSN 8, 5, see steps S205, S103.

A5: The MME/S4-SGSN 8, 5 transmits Create Session request to the selected GW so as to initiate a bearer establishment towards the GW identified by the PDN GW IP address to be used by the first UE 7a, see step S109.

A6: The GW initiates a new Gx session according to procedures disclosed in the 3GPP standard.

A7: The PCRF node 2 responds to the Gx session request according to procedures disclosed in the 3GPP standard.

A8: The GW sends a Create Session Response to the MME/S4-SGSN 8, 5 according to procedures disclosed in the 3GPP standard.

A9: The attachment procedure is completed.

Embodiment B

Figure 8:
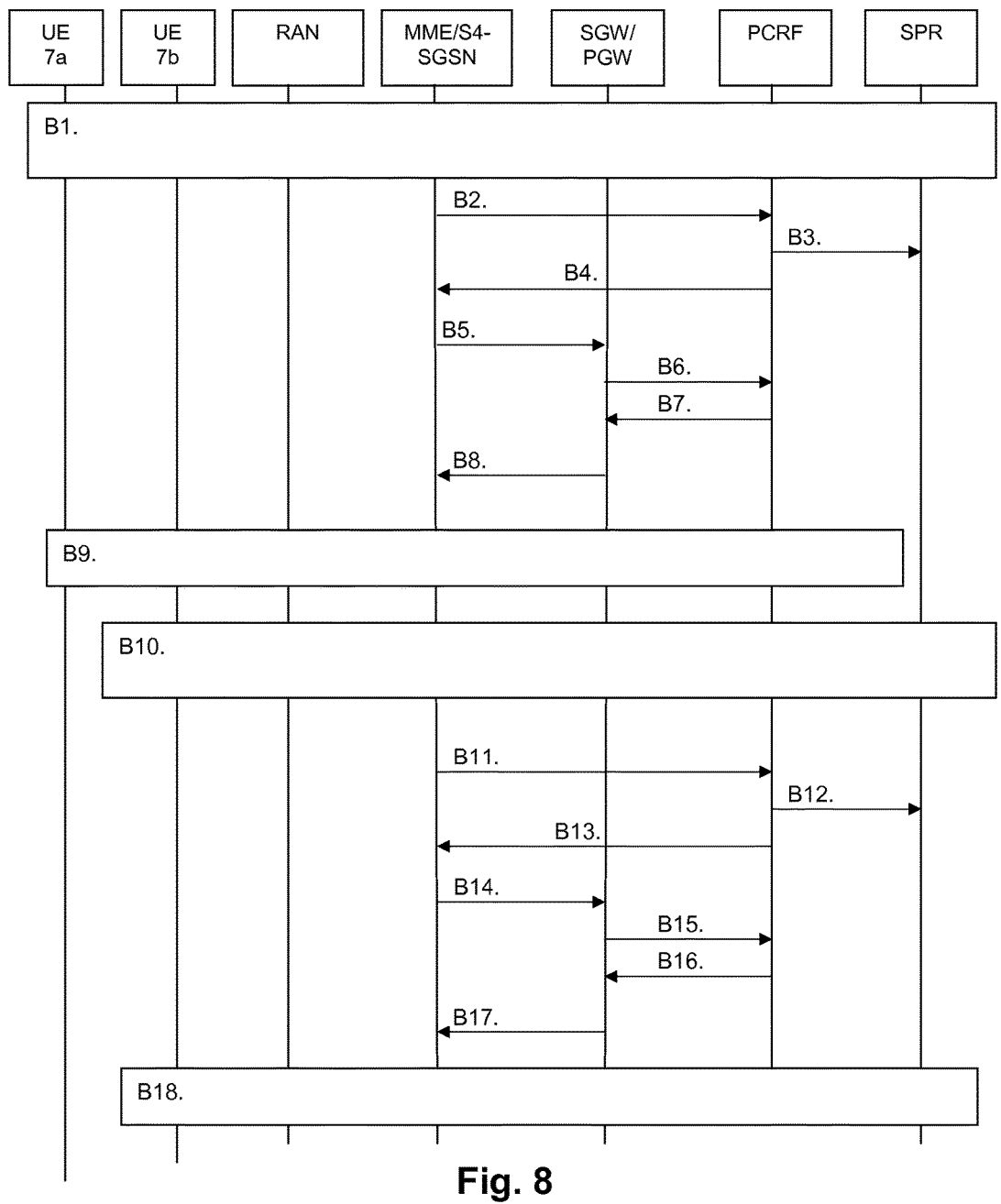

FIG. 8 illustrates how mobile GW selection may be performed according to a second non-limiting embodiment. In essence, this embodiment relates to concurrent sessions of users associated with a defined group. As noted above, a group may be defined in the SPR. The group may be defined, inter alia by employees of a company belonging to a group. Further, the company may have agreed with the mobile operator a limit to the maximum bandwidth that can be assigned in total for all simultaneously connected employees. B1-B17 denotes the steps performed according to the present embodiment.

B1: A first UE 7a in a group of UEs defined in the SPR establishes an IP CAN session. The MME node 8 or S4-SGSN 5 receives the PDN GW IP address as part of the DNS resolution process based on the APN, see step S105.

B2: The PDN GW IP address of the first UE 7a is forwarded by the MME/S4-SGSN 8, 5 to the PCRF node 2 over a direct interface 19, see steps S101 and S201.

B3: The PCRF node 2 based on policies and considering subscription information retrieved from the SPR, determines the PDN GW IP address to be used for the PDN connection for the first UE 7a, see steps S203 and S207. In the present embodiment as this is the first session established by one member of the defined group, the PCRF node 2 selects a first PDN GW IP address.

B4: The PCRF node 2 transmits the determined PDN GW IP address to the MME/S4-SGSN 8, 5, see steps S205, S103.

B5: The MME/S4-SGSN 8, 5 transmits Create Session request to the selected GW so as to initiate a bearer establishment towards the GW identified by the PDN GW IP address to be used by the first UE 7a, see step S109.

B6: The GW initiates a new Gx session according to procedures disclosed in the 3GPP standard.

B7: The PCRF node 2 responds to the Gx session request according to procedures disclosed in the 3GPP standard.

B8: The GW sends a Create Session Response to the MME/S4-SGSN 8, 5 according to procedures disclosed in the 3GPP standard.

B9: The first attachment procedure is completed.

B10: A second UE 7b of the defined group establishes an IP CAN session. The MME node 8 or S4-SGSN 5 receives the PDN GW IP address as part of the DNS resolution process based on the APN, see step S105.

B11: The PDN GW IP address of the second UE 7b is forwarded by the MME/S4-SGSN 8, 5 to the PCRF node 2 over a direct interface 19, see step S113 and S201.

B12: The PCRF node 2 based on policies and considering subscription information retrieved from the SPR, determines the PDN GW IP address to be used for the PDN connection for the second UE 7b, see steps S203 and S207. In the present embodiment as this is the second session established by one member of the defined group, the PCRF node 2 selects the same PDN GW IP address as for the first session (i.e. as determined in step B3). That is, the PDN GW IP addresses of the first UE 7a and the second UE 7b of the same group are identical.

B13: The PCRF node 2 transmits the determined PDN GW IP address to the MME/S4-SGSN 8, 5, see steps S205, S115.

B14: The MME/S4-SGSN 8, 5 transmits Create Session request to the selected GW so as to initiate a bearer establishment towards the GW identified by the PDN GW IP address to be used by the second UE 7b, see step S109.

B15: The GW initiates a new Gx session according to procedures disclosed in the 3GPP standard.

B16: The PCRF node 2 responds to the Gx session request according to procedures disclosed in the 3GPP standard.

B17: The GW sends a Create Session Response to the MME/S4-SGSN 8, 5 according to procedures disclosed in the 3GPP standard.

B18: The second attachment procedure is completed.

In the present embodiment, since the same GW has been selected for both the first session and the second session, the PCEF residing in this GW will be enabled to enforce common policies, such as a common maximum bandwidth, applicable to both sessions.

Embodiment C

Figure 9:
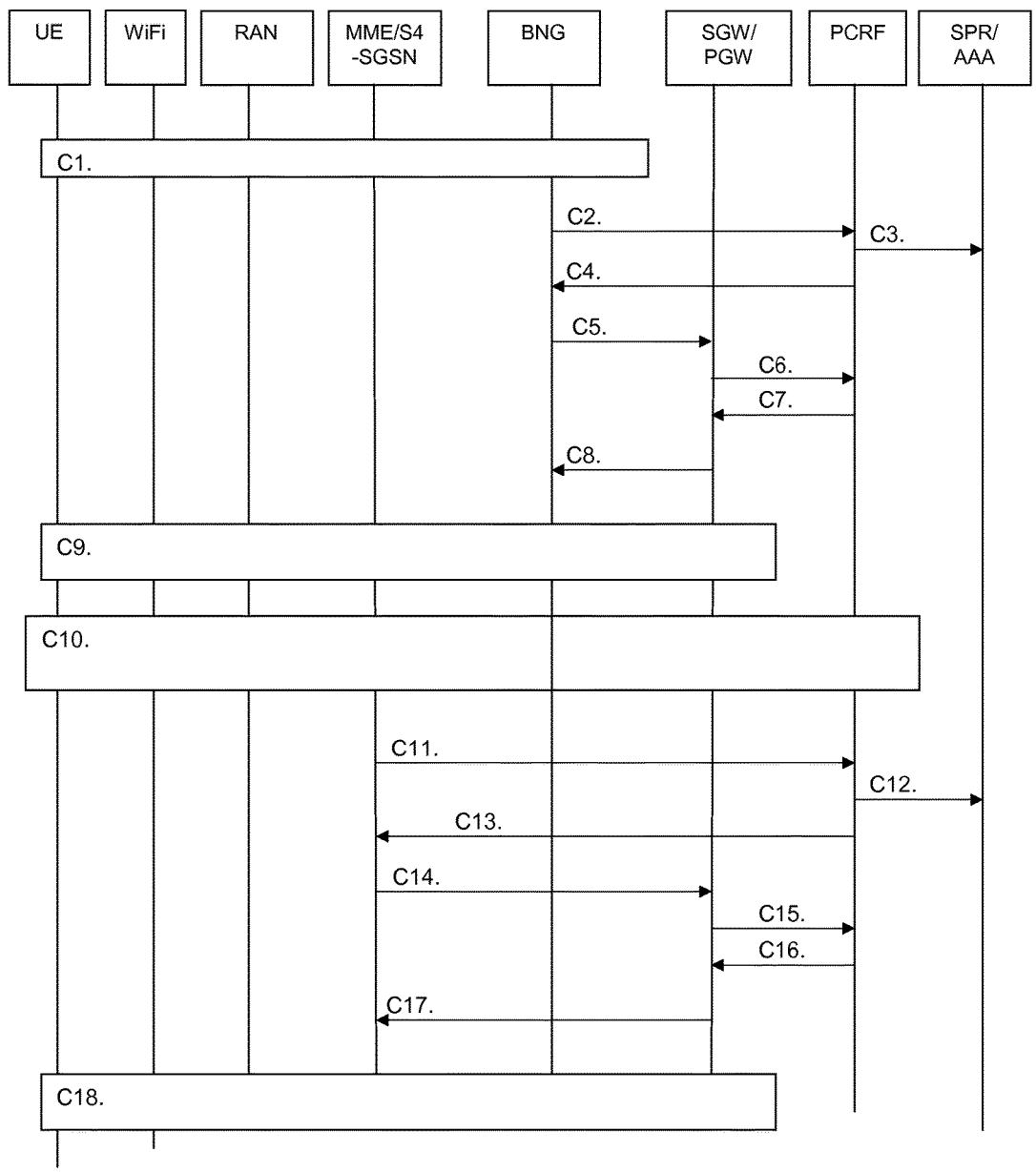

FIG. 9 illustrates how mobile GW selection may be performed according to a third non-limiting embodiment. In essence, this embodiment relates to fixed mobile convergence. C1-C18 denotes the steps performed according to the present embodiment.

C1: A first UE 7a establishes a PDN connection for a wireless local area network connectivity session, such as WiFi.

C2: The Broadband Network Gateway (BNG, also denoted Broadband Remote Access Server) transmits an authentication request to the PCRF node 2. This may be a RADIUS EAP SIM (Extensible Authentication Protocol for GSM Subscriber Identity Module) authentication request message.

C3: The PCRF node 2 authenticates the first UE 7a based on EAP SIM procedures. The details of this procedure are known in the art and are therefore not further disclosed herein. The procedure inter alia comprises selecting a PDN GW IP address of the first UE 7a. The PCRF note 2 contacts the mobile AAA (authentication, authorization and accounting) for this authentication. In general terms, the PCRF node 2 may function as the authentication server that is arranged to authenticate the first UE 7a if the PCRF node 2 provides an authentication function. Alternatively the authentication of the first UE 7a is performed by the PCRF node 2 in collaboration with a AAA node, wherein the PCRF node 2 is arranged to serve as proxy of the authentication messages towards the AAA. However, independently of whether the PCRF node 2 functions as the authentication server itself or if the PCRF node 2 is arranged to operate as a auxiliary node in the middle of the authentication procedure as performed by the AAA, the PCRF node 2 is arranged to insert information in the response to the BNG to select the PDN GW address for the establishment of the tunnel between the BNG and the PDN GW.

C4: If the authentication successes the PCRF node 2 returns a GW address to the BNG.

C5: The BNG initiates a bearer establishment towards the selected GW.

C6: The GW initiates a new Gx session according to procedures known in the art.

C7: The PCRF node 2 responds the Gx session according to procedures known in the art.

C8: The GW transmits a Create Session Response to the BNG according to procedures known in the art.

C9: The first attachment procedure is completed.

C10: The same UE 7a (i.e., the herein denoted first UE 7a) establishes a second session (PDN-connection/PDP-context), the second session being a cellular radio connectivity session. The second session may thus be established through a 3GPP access, e.g. according to LTE. The MME node 8 or S4-SGSN 5 receives the PDN GW IP address as part of the DNS resolution process based on the APN, see step S105.

C11: The PDN GW IP address of the second session for the first UE 7a is forwarded by the MME/S4-SGSN 8, 5 to the PCRF node 2 over a direct interface 19, see step S113 and S201.

C12: The PCRF node 2 based on policies and considering subscription information (e.g. retrieved from the SPR), determines the PDN GW IP address to be used for the PDN connection for the second session for the first UE 7a, see steps S203 and S207. In the present embodiment, as this is the second session established by the first UE 7a, the PCRF node 2 selects the same PDN GW IP address as for the first session (i.e. as determined in step C3). That is, the PDN GW IP addresses of the first session and the second session for the same UE 7a are identical.

C13: The PCRF node 2 transmits the determined PDN GW IP address to the MME/S4-SGSN 8, 5, see steps S205, S115.

C14: The MME/S4-SGSN 8, 5 transmits Create Session request to the selected GW so as to initiate a bearer establishment towards the GW identified by the PDN GW IP address to be used by the first UE 7a for the second session, see step S109.

C15: The GW initiates a new Gx session according to procedures disclosed in the 3GPP standard.

C16: The PCRF node 2 responds to the Gx session request according to procedures disclosed in the 3GPP standard.

C17: The GW sends a Create Session Response to the MME/S4-SGSN 8, 5 according to procedures disclosed in the 3GPP standard.

C18: The second attachment procedure is completed.

With the mechanism described, both sessions (i.e. the first session pertaining to wireless local area network connectivity and the second session pertaining to cellular radio connectivity) for the same UE 7a will be served by the same GW. This enables converged policies at a single common enforcement point.

Some embodiments being described above can be summarized as follows:

One embodiment is directed to a method for mobile gateway, GW, selection, the method being performed by a Mobility Management Entity, MME, node 8 or an S4-SGSN 5, see e.g. steps 2 and 4.

The method comprises the steps of:
- transmitting S101 a request message for a Packet Data Network, PDN, Gateway, GW, Internet Protocol, IP, address to be used for establishing a session for a first user equipment, UE 7a to a Policy and Charging Rules Function, PCRF, node 2 through a direct MME/S4-SGSN-PCRF interface 19;
- receiving S103 a confirmation message comprising a PDN GW IP address to be used for establishing the session from the PCRF node 2 through the direct MME/S4-SGSN-PCRF interface 19.

The PDN GW IP address may provide the PDN with connectivity for an IP Connectivity Access Network, CAN, session established by the UE.

The request message may comprise an initial PDN GW IP address for the session; and the PDN GW IP address to be used may by the PCRF node be determined to be either identical to or different from the initial PDN GW IP address.

The method may further comprise receiving a session establishment request, e.g. receiving S105 a session establishment request for the first UE 7a prior to transmitting the request message and wherein the initial address is obtained from the session establishment request.

The method may further comprise overwriting the initial PDN GW IP address (dynamic selection), e.g. overwriting S107 the initial PDN GW IP address in case the PDN GW IP address to be used is different from the initial PDN GW IP address.

The method may further comprise initiating a bearer establishment, e.g. initiating S109 a bearer establishment towards the GW identified by the PDN GW IP address to be used by the first UE.

The same PDN GW IP address may be used for subsequent sessions. For example, the confirmation message may be denoted an original confirmation message, and the method may further comprise:
- receiving S111 a further session establishment request for the first UE 7a or from a further UE 7b associated with the first UE after initiating said bearer establishment, and
- transmitting S113 a further request message for a PDN GW IP address to be used for establishing a further session for one of said first UE 7a or said further UE 7b, to the PCRF node through the direct MME/S4-SGSN-PCRF interface; and
- receiving S115 a further confirmation message comprising a PDN GW IP address identical to the PDN GW IP address of the original confirmation message to be used for establishing said further session from the PCRF node through the direct MME/S4-SGSN-PCRF interface.

Another embodiment is directed to a method for mobile gateway, GW, selection, the method being performed by a Policy and Charging Rules Function, PCRF, node 2, see e.g. steps 2 and 4 (and partly 3).

The method comprises the steps of:
- receiving S201 a request message for a Packet Data Network, PDN, Gateway, GW, Internet Protocol, IP, address to be used for establishing a session for a first user equipment UE 7a from a Mobility Management Entity, MME, node 8 or S4-SGSN 5 through a direct MME/S4-SGSN-PCRF interface 19;
- determining S203 a PDN GW IP address to be used for establishing the session based on policies for the first UE; and
- transmitting S205 the PDN GW IP address to be used for establishing the session to said MME node 8 or said S4-SGSN 5 through the direct MME/S4-SGSN-PCRF interface 19.

The request message may comprise a initial PDN GW IP address of the session; and the PDN GW IP address to be used may by the PCRF node be determined to be either identical to or different from the initial PDN GW IP address.

The determining the PDN GW IP address to be used may further comprise: retrieving S207 said policies from a Subscription Profile Repository, SPR, see e.g. step 3 (or 12).

Generally, the UE 7a may be associated with at least one user account, and the policies may comprise information relating to at least one of: user subscription information of the user account; UE location; on-going sessions of the user account and/or UE; or of other user account; and/or further UE 7b associated with the user account; or a maximum bandwidth allowed for the user account(s) and/or UE(s) 7a, 7b.

The associations mentioned above may correspond to a group defined for the UE 7a and/or 7b in the SPR.

The PDN GW IP address to be used may be determined such that a common PDN GW IP address is to be used for a wireless local area network connectivity session and a cellular radio connectivity session for the UE 7a and/or 7b. This may e.g. correspond to a common GW for WiFi (local area network) and 3GPP (cellular radio).

Another embodiment is directed to a Mobility Management Entity, MME, node 8 or an S4-SGSN 5 for mobile gateway, GW, selection, comprising:
- an input/output, I/O, interface 15 arranged to transmit a request message for a Packet Data Network, PDN, Gateway, GW, Internet Protocol, IP, address to be used for establishing a session for a first user equipment, UE 7a to a Policy and Charging Rules Function, PCRF, node 2 through a direct MME/S4-SGSN-PCRF interface 19; and
- the I/O interface further being arranged to receive a confirmation message comprising a PDN GW IP address to be used for establishing the session from the PCRF node 2 through the direct MME/S4-SGSN-PCRF interface 19.

Another embodiment is directed to a Policy and Charging Rules Function, PCRF, node 2 for mobile gateway, GW, selection, comprising:
- an input/output, I/O, interface 18 arranged to receive a request message for a Packet Data Network, PDN, Gateway, GW, Internet Protocol, IP, address to be used for establishing a session for a first user equipment, UE, 7a from a Mobility Management Entity, MME, node 8 or an S4-SGSN 5 through a direct MME/S4-SGSN-PCRF interface 19;
- a processing unit 16 arranged to determine a PDN GW IP address to be used for establishing the session based on policies for the first UE; and
- the I/O interface further being arranged to transmit the PDN GW IP address to be used for establishing the session to said MME node 8 or said S4-SGSN 5 through the direct MME/S4-SGSN-PCRF interface 19.

Another embodiment is directed to a computer program 11a for mobile gateway, GW, selection, the computer program comprising computer program code which, when run on a Mobility Management Entity, MME, node 8 or an S4-SGSN 5, causes the MME node or S4-SGSN node to:

transmit S101 a request message for a Packet Data Network, PDN, Gateway, GW, Internet Protocol, IP, address to be used for establishing a session for a first user equipment, UE, 7a to a Policy and Charging Rules Function, PCRF, node 2 through a direct MME/S4-SGSN-PCRF interface 19; and receive S103 a confirmation message comprising a PDN GW IP address to be used for establishing the session from the PCRF node 2 through the direct MME/S4-SGSN-PCRF interface 19.

Another embodiment is directed to a computer program 11b for mobile gateway, GW, selection, the computer program comprising computer program code which, when run on a Policy and Charging Rules Function, PCRF, node 2, causes the PCRF node to:

receive S201 a request message for a Packet Data Network, PDN, Gateway, GW, Internet Protocol, IP, address to be used for establishing a session for a first user equipment, UE, 7a from a Mobility Management Entity, MME, node 8 or an S4-SGSN 5 through a direct MME/S4-SGSN-PCRF interface 19;

determining S203 a PDN GW IP address to be used for establishing the session based on policies for the first UE; and transmitting S205 the PDN GW IP address to be used for establishing the session to said MME node 8 or said S4-SGSN 5 through the direct MME/S4-SGSN-PCRF interface 19.

The present disclosure has mainly been described above with reference to a few embodiments. Common for all embodiments is a mechanism for selecting a certain PDN GW address depending on policies. For example, with references to Embodiments 2 and 3 the present disclosure provides mechanisms to involve the PCRF in the PDN GW address selection with the purpose to force the use of the same GW for concurrent sessions of a single UE or user account, or for sessions of a group of UE or user accounts. However, the disclosed mechanism may select a certain PDN GW address without necessarily considering the PDN GW selected for other associated sessions. For example, it could be that the PCRF selects a certain PDN GW for a UE based on policy parameters such as quota limits or based on the UE subscribing to certain services. Thus, as is readily appreciated by a person skilled in the art, other embodiments than the ones disclosed above are equally possible within the scope of the present disclosure, as defined by the appended patent claims.

The invention claimed is:

1. A method for mobile gateway (GW) selection, the method comprising the steps of:

transmitting, by a network node, a request message to a Policy and Charging Rules Function (PCRF) node for a first Packet Data Network Gateway (PDN GW) Internet Protocol (IP) address to be used for establishing a session for a first user equipment (UE) through a direct interface between the PCRF node and the network node, wherein the network node is at least one of a Mobility Management Entity (MME) node and an S4-Serving General Packet Radio Service Support Node (S4-SGSN), and wherein the transmitted request message comprises a second PDN GW IP address for the session; and receiving, by the network node, a confirmation message transmitted by the PCRF node through the direct interface between the PCRF node and the network node, the confirmation message comprising the first PDN GW IP address to be used for establishing the session.

2. The method according to claim 1, wherein the first PDN GW IP address provides the PDN with connectivity for an IP Connectivity Access Network (CAN) session established by the UE.

3. The method according to claim 1, wherein the first PDN GW IP address to be used by the PCRF node is determined to be either identical to or different from the second PDN GW IP address.

4. The method according to claim 1, further comprising:
receiving, by the network node, a session establishment request for the first UE prior to transmitting the request message and wherein the second PDN GW IP address is obtained from the session establishment request.

5. The method according to claim 3, wherein the first PDN GW IP address is different from the second PDN GW IP address, and further comprising:
overwriting, by the network node, the second PDN GW IP address with the first PDN GW IP address.

6. The method according to claim 1, further comprising:
initiating, by the network node, a bearer establishment towards the GW identified by the first PDN GW IP address to be used by the first UE.

7. The method according to claim 6, wherein the confirmation message is denoted an original confirmation message, the method further comprising:
receiving, by the network node, a further session establishment request for the first UE or from a further UE associated with the first UE after initiating said bearer establishment; and transmitting, by the network node, a further request message to the PCRF node for a third PDN GW IP address to be used for establishing a further session for one of said first UE or said further UE through the direct interface between the PCRF node and the network node; and receiving, by the network node, a further confirmation message from the PCRF node through the direct interface between the PCRF node and the network node, the further confirmation message comprising the third PDN GW IP address identical to the first PDN GW IP address of the original confirmation message to be used for establishing said further session.

8. A method for mobile gateway (GW) selection, the method comprising the steps of:

receiving, by a Policy and Charging Rules Function (PCRF) node, a request message for a first Packet Data Network Gateway (PDN GW) Internet Protocol (IP) address to be used for establishing a session for a first user equipment (UE) from a network node through a direct interface between the PCRF node and the network node, wherein the network node is at least one of a Mobility Management Entity (MME) node and an S4-Serving General Packet Radio Service Support Node (S4-SGSN), and wherein the received request message comprises a second PDN GW IP address for the session;

determining, by the PCRF node, the first PDN GW IP address to be used for establishing the session based on policies for the first UE; and transmitting, by the PCRF node, the first PDN GW IP address to be used for establishing the session to the network node through the direct interface between the PCRF node and the network node.

9. The method according to claim 8, wherein the first PDN GW IP address to be used is by the PCRF node determined to be either identical to or different from the second PDN GW IP address.

10. The method according to claim 8, wherein determining the first PDN GW IP address to be used further comprises:
   retrieving, by the PCRF node, said policies from a Subscription Profile Repository, SPR.

11. The method according to claim 8, wherein the UE is associated with at least one user account, and wherein the policies comprise information relating to at least one of user subscription information of the user account, UE location, on-going sessions of the user account and/or UE, or of other user account and/or UE associated with the user account, and a maximum bandwidth allowed for the user account and/or UE.

12. The method according to claim 11, wherein associations correspond to a group defined for the UE in the SPR.

13. The method according to claim 8, wherein the first PDN GW IP address to be used is determined such that a common PDN GW IP address is to be used for a wireless local area network connectivity session and a cellular radio connectivity session for the UE.

14. A network node for mobile gateway (GW) selection, comprising:
   an input/output, I/O, interface arranged to transmit, by the network node, a request message to a Policy and Charging Rules Function (PCRF) node for a first Packet Data Network Gateway (PDN GW) Internet Protocol (IP) address to be used for establishing a session for a first user equipment (UE) through a direct interface between the PCRF node and the network node, wherein the network node is at least one of a Mobility Management Entity (MME) node and an S4-Serving General Packet Radio Service Support Node (S4-SGSN), and wherein the transmitted request message comprises a second PDN GW IP address for the session; and
   the I/O interface further being arranged to receive, by the network node, a confirmation message transmitted by the PCRF node through the direct interface between the PCRF node and the network node, the confirmation message comprising the first PDN GW address to be used for establishing the session.

15. A Policy and Charging Rules Function (PCRF) node for mobile gateway (GW) selection, comprising:
   an input/output, I/O, interface arranged to receive, by the PCRF node, a request message for a first Packet Data Network Gateway (PDN GW) Internet Protocol (IP) address to be used for establishing a session for a first user equipment (UE) from a network node through a direct interface between the PCRF node and the network node, wherein the network node is at least one of a Mobility Management Entity (MME) node and an S4-Serving General Packet Radio Service Support Node (S4-SGSN), and wherein the received request message comprises a second PDN GW IP address for the session;
   a processing unit arranged to determine, by the PCRF node, the first PDN GW IP address to be used for establishing the session based on policies for the first UE; and
   the I/O interface further being arranged to transmit, by the PCRF node, the first PDN GW IP address to be used for establishing the session to the network node through the direct interface between the PCRF node and the network node.

16. A computer program product comprising a non-transitory computer readable medium storing a computer program for mobile gateway (GW) selection, the computer program comprising computer program code which, when run on a network node, causes the network node to perform a set of operations comprising:
   transmit, by the network node, a request message to a Policy and Charging Rules Function (PCRF) node for a first Packet Data Network Gateway (PDN GW) Internet Protocol (IP) address to be used for establishing a session for a first user equipment (UE) through a direct interface between the PCRF node and the network node, wherein the network node is at least one of a Mobility Management Entity (MME) node and an S4-Serving General Packet Radio Service Support Node (S4-SGSN), and wherein the transmitted request message comprises a second PDN GW IP address for the session; and
   receive, by the network node, a confirmation message transmitted by the PCRF node through the direct interface between the PCRF node and the network node, the confirmation message comprising the first PDN GW IP address to be used for establishing the session.

17. A computer program product comprising a non-transitory computer readable medium storing a computer program for mobile gateway (GW) selection, the computer program comprising computer program code which, when run on a Policy and Charging Rules Function (PCRF) node causes the PCRF node to perform a set of operations comprising:
   receiving, by the PCRF node, a request message for a first Packet Data Network Gateway (PDN GW) Internet Protocol (IP) address to be used for establishing a session for a first user equipment (UE) from a network node through a direct interface between the PCRF node and the network node, wherein the network node is at least one of a Mobility Management Entity (MME) node and an S4-Serving General Packet Radio Service Support Node (S4-SGSN), and wherein the received request message comprises a second PDN GW IP address for the session;
   determining, by the PCRF node, the first PDN GW IP address to be used for establishing the session based on policies for the first UE; and
   transmitting, by the PCRF node, the first PDN GW IP address to be used for establishing the session the network node through the direct interface between the PCRF node and the network node.

* * * * *